US012678721B2

(12) United States Patent
Jokschas et al.

(10) Patent No.: US 12,678,721 B2
(45) Date of Patent: Jul. 14, 2026

(54) LIQUID FILTER AND FILTER ELEMENT

(71) Applicant: MANN+HUMMEL GmbH, Ludwigsburg (DE)

(72) Inventors: Guenter Jokschas, Murrhardt (DE);
Marco Faisst, Besigheim (DE);
Christian Thalmann, Speyer (DE);
Martin Weindorf, Kornwestheim (DE);
Oliver Glueck, Stuttgart (DE); Rafael Salom, Remseck (DE); Pius Trautmann, Stuttgart (DE); Lavanya Kagitha, Ludwigsburg (DE); Dietmar Talmon-Gros, Ludwigsburg (DE);
Matthias Ruegner,
Bietigheim-Bissingen (DE);
Gerrit-Tobias Speidel, Kirchheim am Neckar (DE); Arndt-Udo Rolle,
Stuttgart (DE); Mike Maertz,
Harthausen (DE); Herbert Jainek,
Heilbronn (DE); Maximilian Bauch,
Boennigheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 447 days.

(21) Appl. No.: 18/332,039

(22) Filed: Jun. 9, 2023

(65) Prior Publication Data

US 2024/0009603 A1 Jan. 11, 2024

(30) Foreign Application Priority Data

Jul. 8, 2022 (DE) .......................... 102022117115.9

(51) Int. Cl.
*B01D 35/30* (2006.01)

(52) U.S. Cl.
CPC .......... *B01D 35/30* (2013.01); *B01D 2201/30* (2013.01); *B01D 2201/31* (2013.01); *B01D 2201/34* (2013.01)

(58) Field of Classification Search
CPC ...... B01D 35/30; B01D 35/306; B01D 29/96; B01D 2201/24; B01D 2201/291;
(Continued)

(56) References Cited

U.S. PATENT DOCUMENTS 3,379,206 A * 4/1968 Whiting ............... B01D 35/143
137/553
3,591,003 A * 7/1971 Cooper ................ B01D 35/143
210/90
(Continued)

FOREIGN PATENT DOCUMENTS

DE 10216847 A1 11/2003
GB 2 290 486 * 1/1996
GB 2290486 A * 1/1996 ............. B01D 29/21

*Primary Examiner* — Benjamin M Kurtz

(57) ABSTRACT

A liquid filter has a filter housing with a housing cup. A filter element of the liquid filter has a filter medium annularly surrounding a longitudinal axis of the filter element. The filter element has an extension part with lock groove. A lock device arranged at the housing cup has a lock element movable radially to the longitudinal axis. The lock element engages the lock groove in a locked state of the lock device and is disengaged in a release state. A filter element for the liquid filter has a filter medium annularly surrounding a longitudinal axis and an extension part with lock groove with rounded cross section. The lock groove is engaged by a lock element, movable radially relative to the longitudinal axis, of a lock device of a housing cup of the liquid filter in a locked state of the lock device and disengaged in a release state.

20 Claims, 6 Drawing Sheets

(58) Field of Classification Search
CPC .......... B01D 2201/305; B01D 2201/30; B01D 2201/31; B01D 2201/40; B01D 2201/4007; B01D 2201/4015; B01D 2201/4084
See application file for complete search history.

(56) References Cited

U.S. PATENT DOCUMENTS

| | | | |
|---|---|---|---|
| 8,801,925 | B2 | 8/2014 | Almasian et al. |
| 2002/0153297 | A1 | 10/2002 | Bozenmayer |
| 2008/0217235 | A1 | 9/2008 | Weindorf et al. |
| 2008/0308481 | A1 | 12/2008 | Wieczorek et al. |
| 2009/0101595 | A1 | 4/2009 | Allott et al. |
| 2013/0075319 | A1 | 3/2013 | Roesgen |
| 2014/0291226 | A1 | 10/2014 | Uhl et al. |
| 2015/0231539 | A1 | 8/2015 | Hasenfratz et al. |
| 2017/0080365 | A1 | 3/2017 | Morris et al. |
| 2017/0095759 | A1 | 4/2017 | Martin |
| 2017/0173507 | A1 | 6/2017 | Allott et al. |
| 2018/0001238 | A1 | 1/2018 | Straussberger et al. |
| 2019/0054402 | A1 | 2/2019 | Fitzgerald |

* cited by examiner

LIQUID FILTER AND FILTER ELEMENT

CROSS-REFERENCE TO RELATED APPLICATION

This application claims the benefit under 35 U.S.C. 119(a) of German Application No. 102022117115.9 filed on Jul. 8, 2022, in the German Patent Office, the entire disclosure of which is incorporated herein by reference for all purposes.

BACKGROUND

The invention concerns a liquid filter comprising a filter housing with a filter head and a housing cup and further comprising a filter element with a filter medium which surrounds a longitudinal axis annularly.

Such liquid filters are well known in the prior art. Such filters are used for filtering fuel or oil, for example.

For an exchange of the filter element, the housing cup is detached from the filter head. In order to avoid soiling and contamination of the environment, it is expedient in this context to remove the liquid from the housing cup prior to opening the filter housing or prior to removing the filter element from the housing cup.

A liquid filter of the aforementioned kind is disclosed, for example, in DE 20 2008 013 578 U1. In this liquid filter, a drainage socket with a drainage channel is provided. The drainage socket can be moved between a closed position and an open position. The drainage socket glides in this context in a bore in the housing cup. The drainage socket interacts with the filter element. For a detachable engagement, the drainage socket can be screwed with an outer thread into an inner thread of an end plate of the filter element.

A similar liquid filter is disclosed in US 2017/0095759 A1. A drain valve of this liquid filter comprises a valve body with an axial passage and a valve shaft which is embodied at a bottom cap of the filter element. The valve body is movably guided in a bore of the housing cup. The valve shaft is provided with an outer thread for engagement in an inner thread of the valve body. In a groove of the valve shaft, an O-ring for sealing the valve shaft in relation to the valve body is arranged.

In the two aforementioned liquid filters, the respective thread connection between the filter element and the drainage socket or valve body must be released for exchanging the filter element. This entails a certain expenditure.

It is an object of the invention to design the exchange of a filter element to be reliable, simple, and realizable particularly quickly.

SUMMARY

This object is solved by a liquid filter comprising a filter housing with a filter head and a housing cup, a filter element with a filter medium which surrounds a longitudinal axis annularly, wherein the filter element comprises an extension part with a lock groove, wherein a lock device with at least one lock means movable radially in relation to the longitudinal axis is provided at the housing cup, wherein the lock means engages the lock groove in a locked state of the lock device and can be disengaged from the lock groove in a release state of the lock device.

The object is further solved by a use of a filter element with a filter medium, which surrounds a longitudinal axis annularly, in a liquid filter embodied in accordance with the invention, wherein the filter element comprises an extension part.

The object is further solved by a filter element, for a liquid filter embodied in accordance with the invention, the filter element comprising a filter medium, which surrounds a longitudinal axis annularly, and an extension part with a lock groove, wherein the lock groove comprises a rounded, in particular circular segment-shaped, cross section.

Preferred embodiments are disclosed in the respective dependent claims and the description.

According to the invention, a liquid filter is provided. The liquid filter comprises a filter housing with a filter head and a housing cup. The housing cup is in principle detachably connectable to the filter head, for example, can be screwed onto the filter head. The liquid filter comprises furthermore a filter element with a filter medium. The filter medium surrounds a longitudinal axis annularly. The filter medium can be comprised of folded paper. The filter element can be flowed through radially from the exterior to the interior. An interior which is enclosed by the filter medium forms in this case a clean side. The liquid filter can be used for filtering fuel or oil. The liquid filter can be used in a commercial vehicle, for example, a tractor or excavator. The liquid filter, for example, can also be used for filtering transmission oil of an electric motor of an electrically driven motor vehicle.

According to the invention, the filter element comprises an extension part with a lock groove. The extension part extends generally parallel to the longitudinal axis, typically the extension part is arranged concentrically to the longitudinal axis. The extension part in general projects past an end face of the filter medium or an end disk at the end face. The extension part is typically coupled to the filter medium so as to be immobile.

Further according to the invention, a lock device with at least one lock means movable radially in relation to the longitudinal axis is provided at the housing cup. The lock device is typically arranged at a cup bottom of the housing cup. In a locked state of the lock device, the at least one lock means engages the lock groove; in a release state of the lock device, the at least one lock means can be disengaged from the lock groove. A movement of the at least one lock means comprises in this context a movement component radial in relation to the longitudinal axis. It is possible to provide more than one lock means, e.g., at least three, in particular precisely three, lock means can be provided.

In the locked state, the filter element is held safely at the housing cup by the engagement of the at least one lock means in the lock groove. In this way, it can be ensured that, when removing the housing cup from the filter head, the filter element remains in the housing cup and also does not accidentally drop down during further handling. In order to remove the filter element from the housing cup, the locking action can be quickly and easily released. A new filter element can then be inserted into the housing cup and locked at the latter. A displacement of the filter element in the housing cup during mounting at the filter head can therefore be avoided.

Preferably, the lock groove comprises a rounded, in particular circular segment-shaped, cross section. Such a shape of the lock groove can be manufactured simply and enables a safe engagement of the lock means. Due to the rounded shape, an advantageous force flow with minimal stress peaks in the extension part is obtained.

The extension part and a support tube and/or an end disk of the filter element together can be one piece. This simplifies the manufacture and ensures a stable connection of the extension part at the filter medium.

The at least one lock means can be a ball. Balls can be obtained inexpensively. In addition, when using balls as lock means, it can be avoided that they get jammed when establishing or releasing the locking action.

Particularly preferred, the at least one lock means is guided in a holder which is movable in particular along the longitudinal axis between a locked position and a release position. The holder enables, on the one hand, guiding of the at least one lock means. On the other hand, the holder can simplify the release of the at least one lock means from the engagement in the lock groove, in particular when a plurality of lock means are provided. For the locked state of the lock device, the holder is moved into the locked position; for the release state of the lock device, the holder is moved into the release position.

Preferably, the holder is pretensioned into the locked position. In particular, the holder can be pretensioned away from a cup bottom of the housing cup or toward the filter element. By means of the pretension, it can be achieved that a locking action takes place upon insertion of a filter element without further ado. A spring element can be supported with one end at the holder, with the other end at the housing cup, in particular at its cup bottom.

The holder can be received in a receptacle. The receptacle can form a stop for the holder in the locked position. Preferably, the receptacle is locked at the housing cup. This simplifies mounting of the lock device.

Particularly preferred, the at least one lock means is supported at the receptacle in the locked state of the lock device. The receptacle can thus ensure that the lock means is pushed radially inwardly in order to engage the lock groove. In particular, the receptacle can be conical. When the holder with the at least one lock means is transferred along the longitudinal axis into the locked position, the at least one lock means is pushed more and more radially inwardly. Conversely, the lock means can be pushed radially outwardly by insertion of the extension part into the lock device with axial movement of the holder. The insertion of a new filter element into the housing cup is therefore particularly comfortably designed because an additional actuation of the lock device is not required. Rather, it is sufficient to push the filter element into the housing cup.

The lock device can comprise a grip piece for movement of the holder, wherein the grip piece is movable to a limited extent relative to the holder, in particular along the longitudinal axis. The release of the locking action is simplified in this way. When using the liquid filter, the grip piece can be moved into a space-saving position of use. For an exchange of the filter element, the grip piece can be moved into a handling position in which it can be easily gripped. The operation of the lock device is simplified in this way. The handling position is typically defined by a stop between the holder and the grip piece.

Preferably, the grip piece is pretensioned toward an outer side of the housing cup. In this way, it can be achieved that the grip piece automatically is transferred into the handling position. The operation of the lock device is therefore particularly comfortably designed.

The lock device can be arranged at a drainage opening in the housing cup. Preferably, the filter housing comprises a closure screw for the drainage opening. For operating the liquid filter, the drainage opening is closed by the closure screw. Prior to an exchange of the filter element, the drainage opening is opened by removal of the closure screw so that the liquid can drain from the filter cup.

Particularly preferred, the grip piece for the holder is supported at the closure screw when the closure screw closes—in a mounted state—the drainage opening. When screwing in the closure screw, the grip piece is thus moved into the position of use. When removing the closure screw, the grip piece can pass automatically into the handling position, in particular when it is appropriately pretensioned or due to the force of gravity.

The extension part can comprise a continuous longitudinal opening. The continuous longitudinal opening connects an interior of the filter element in fluid communication with an axial end of the extension part. Liquid from the interior can thus be drained through the longitudinal opening. In the mounted state, the closure screw closes the drainage opening as well as the longitudinal opening. A flow of the liquid to be filtered bypassing the filter element can thus be prevented. Upon removal of the closure screw, emptying of the region outside of the filter element as well as of the interior of the filter element is made possible instead.

Alternatively, the extension part can be of a closed design. In particular, the interior of the filter element can be fluid-tightly closed at the extension part.

The extension part can comprise a nose and a compensation element movable in relation to the nose. The compensation element is typically movable along the longitudinal axis in relation to the nose. In the mounted state, the closure screw is coupled with the compensation element, in particular by a seal element. The compensation element can compensate movements between the filter cup, in particular the cup bottom, and the filter element. Such movements can occur, for example, in case of pulsations of the liquid pressure in the liquid filter. In case of a pressure increase, the closure screw at the cup bottom moves away from the filter head due to the elasticity of the housing cup. The filter element, on the one hand, is held in a seal seat at the filter head; on the other hand, the filter element is typically connected seal-tightly to the closure screw in operation. Movements at the sealing locations can be avoided in that a movement possibility between the nose and the compensation element of the extension part is established. The lock groove is typically embodied at the nose of the extension part; alternatively, the lock groove can be embodied at the compensation element. The nose is in principle connected rigidly to the filter medium, for example, by a support tube or an end disk. The nose and the support tube and/or the end disk can be embodied together as one piece.

The scope of the present invention includes also a use of a filter element with a filter medium, which surrounds a longitudinal axis annularly, in a liquid filter according to the invention as described above, wherein the filter element comprises an extension part with a lock groove. The filter element can comprise further features described above. The corresponding advantages can be utilized for the use of the filter element in accordance with the invention.

The scope of the present invention also includes a filter element for an above-described liquid filter according to the invention. The filter element comprises a filter medium which surrounds a longitudinal axis annularly and an extension part with a lock groove. The lock groove comprises a rounded, in particular circular segment-shaped, cross section. Preferably, the extension part and a support tube and/or an end disk of the filter element are embodied together as one piece. The filter element can comprise further features described above. When using the filter element according to the invention in a filter device, the corresponding advantages can be utilized.

BRIEF DESCRIPTION OF DRAWINGS

Further features and advantages of the invention result from the following detailed description of embodiments of the invention, from the claims as well as with the aid of the Figures of the drawing illustrating details according to the invention. The aforementioned and still further explained features can be realized individually by themselves or several thereof in arbitrary expedient combinations in variants of the invention. The features illustrated in the drawing are illustrated such that the particularities according to the invention can be made clearly visible.

DETAILED DESCRIPTION

Figure 1:
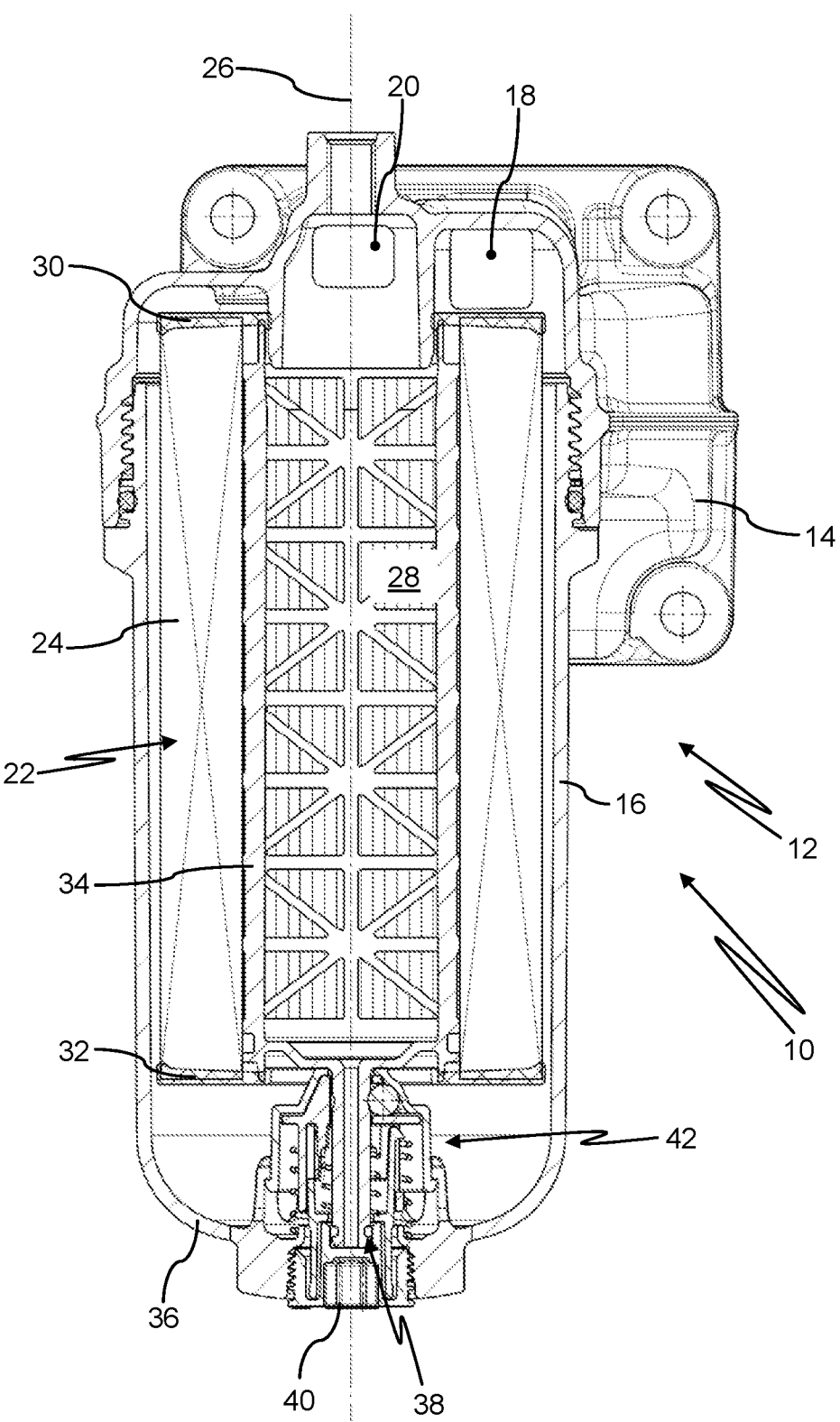
FIG. 1 shows a liquid filter according to the invention with a filter element according to the invention received in a filter housing in a schematic section view, wherein the filter element is locked at a lock device at a housing cup of the filter housing.

FIG. 1 shows a liquid filter 10. The liquid filter 10 comprises a filter housing 12 with a filter head 14 and a housing cup 16 screwed onto the filter head 14. An inlet 18 for liquid to be filtered and an outlet 20 for filtered liquid are formed at the filter head 14.

A filter element 22 of the liquid filter 10 is received in the filter housing 12. The filter element 22 comprises a filter medium 24 which surrounds a longitudinal axis 26 annularly and encloses an interior 28. The filter medium 24 can be paper folded in a star shape. Here, the filter medium 24 can be flowed through radially from the exterior to the interior. The filter medium 24 is framed between an end disk 30 which is correlated with the filter head 14 and a cup-side end disk 32. Radially inwardly, the filter medium 24 is supported on a support tube 34.

A drainage opening 38 is formed in a cup bottom 36 of the housing cup 16. The drainage opening 38 can be closed by insertion of a closure screw 40 (as illustrated) or can be opened by removal of the closure screw 40.

The housing cup 16 comprises a lock device 42 for locking the filter element 22 at the housing cup 16. The lock device 42 is provided at the cup bottom 36 in the region of the drainage opening 38. The details of the lock device 42 and its interaction with the filter element 22 will be explained in the following with the aid of different exemplary embodiments.

Figure 2:
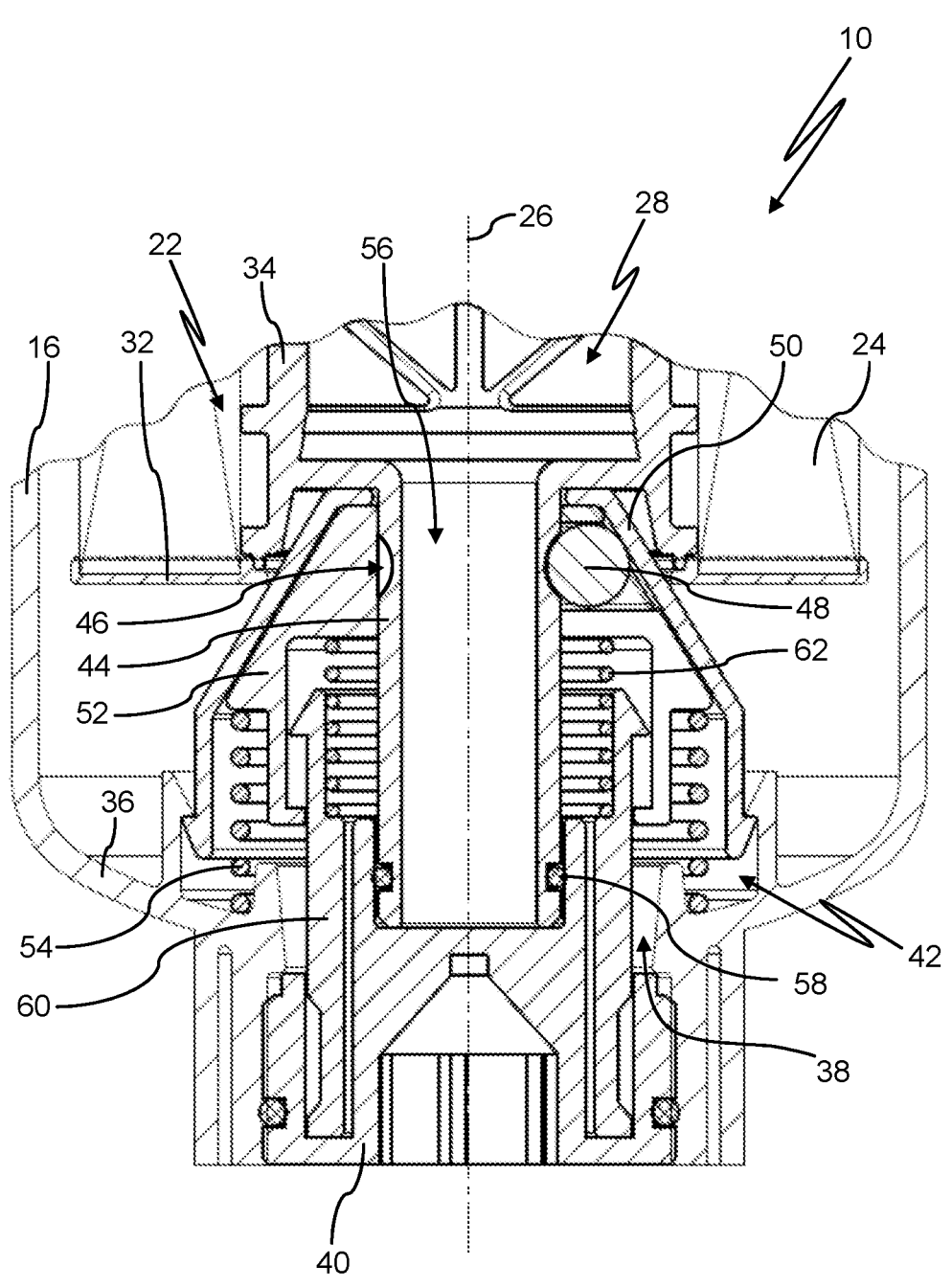
FIG. 2 shows a schematic enlarged illustration of a first embodiment of the liquid filter according to the invention in the region of the lock device in a locked state with screwed-in closure screw.

FIG. 2 shows a detail of a first embodiment of the liquid filter 10 in the region of the lock device 42. In FIG. 2, the lock device 42 is in a locked state in which the filter element 22 is locked at the housing cup 16.

The filter element 22 comprises an extension part 44. The extension part 44 projects concentrically to the longitudinal axis 26 away from the filter element 22, in particular, the extension part 44 projects past the cup-side end disk 32 in axial direction (in relation to the longitudinal axis 26). The extension part 44 is here integrally formed as one piece together with the support tube 34.

A lock groove 46 is formed in the extension part 44. Presently, the lock groove 46 comprises a rounded cross section. Concretely, the lock groove 46 is formed by a circular segment-shaped recess in the extension part 44.

In the locked state, at least one lock means 48 engages the lock groove 46. The lock means 48 are here embodied as balls. Radially outwardly, the lock means 48 in the locked state engage a conical receptacle 50 of the lock device 42. The receptacle 50 is fastened at the housing cup 16, for example, locked thereat. The filter element 22, due to the lock means 48 supported between the lock groove 46 and the receptacle 50, cannot be removed from the housing cup 16 as long as the lock device 42 is in the locked state.

The lock means 48 are guided in a holder 52. The holder 52 is movable within the receptacle 50 along the longitudinal axis 26. The holder 52 is pretensioned by a spring element 54 into a locked position, here from the cup bottom 36 toward the filter element 22. In the locked position, the holder 52 is resting at the receptacle 50 which, in other words, forms a stop for the holder 52.

The extension part 44 comprises here a continuous longitudinal opening 56. The longitudinal opening 56 opens the interior 28 in axial direction outwardly.

FIG. 2 shows the closure screw 40 screwed into the drainage opening 38. The closure screw 40 closes thus the drainage opening 38. Furthermore, the closure screw 40 closes the longitudinal opening 56 of the extension part 44. For this purpose, a seal element 58 can be arranged between the extension part 44 and the closure screw 40.

In the embodiment illustrated in FIG. 2, the lock device 42 comprises a grip piece 60 for the holder 52. The grip piece 60 is guided at the holder 52 so as to be slidable in longitudinal direction. Presently, the grip piece 60 is pretensioned by a further spring element 62 away from the holder 52 toward an exterior side of the housing cup 16. When the closure screw 40 is inserted, the grip piece 60 is thus pushed against the closure screw 40. The mounted closure screw 40 holds the grip piece 60 in the illustrated position of use for a filtering operation of the liquid filter 10.

Figure 3:
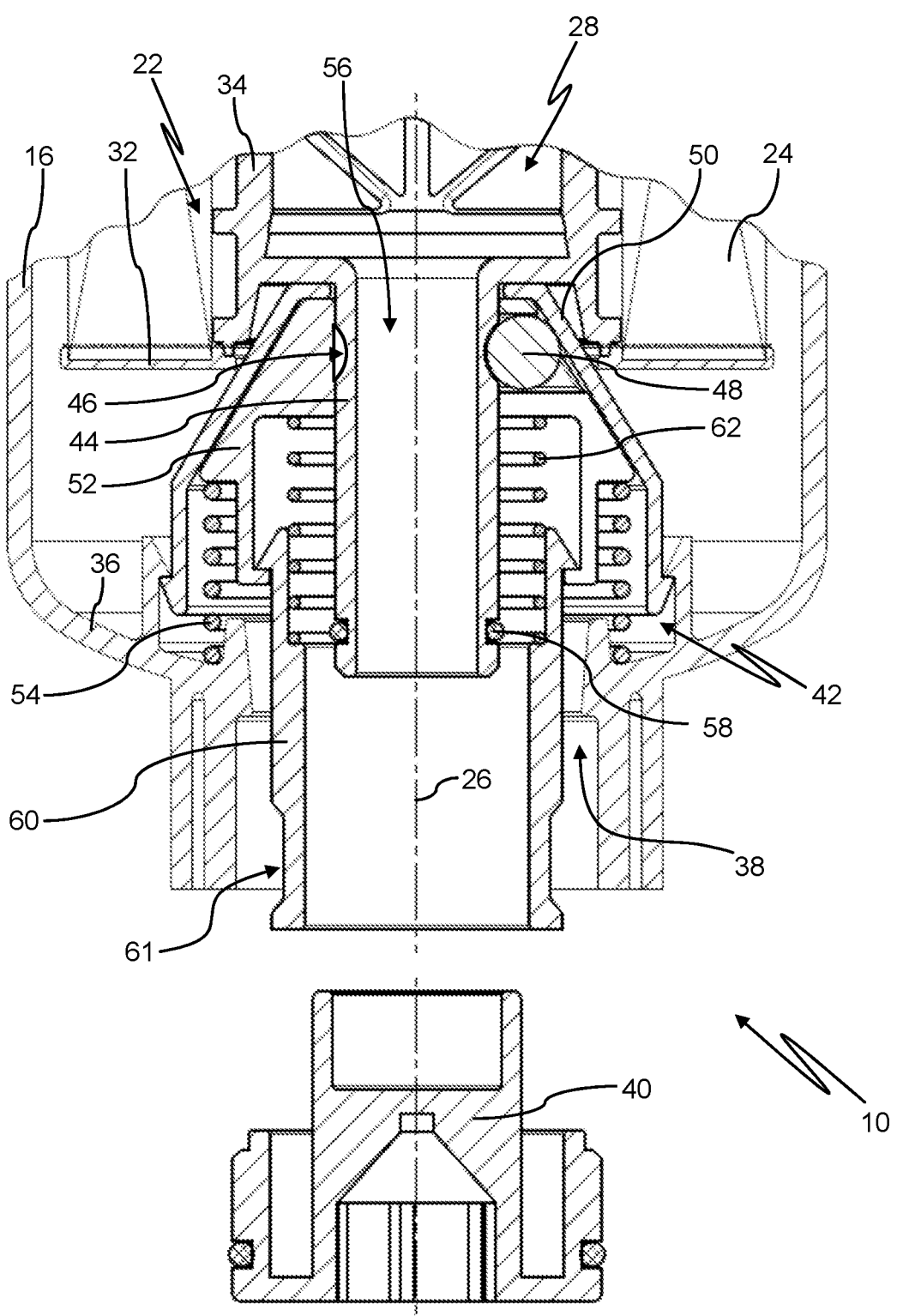
FIG. 3 shows the liquid filter of FIG. 2 with removed closure screw, wherein a grip piece of the lock device projects from the filter cup, in a schematic section view.

The grip piece 60 serves for releasing the locking action of the filter element 22 at the housing cup 16. For an exchange of the filter element 22, first the closure screw 40 is removed, see FIG. 3. The liquid contained in the housing cup 16 can thus drain through the drainage opening 38. In particular, liquid from the interior 28 of the filter element 22 can be discharged through the longitudinal opening 56 in the extension part 44 and the drainage opening 38.

With the closure screw 40 removed, the spring element 62 pushes the grip piece 60 away from the holder 52 so that the grip piece 60 is moved into a handling position in which it projects in axial direction away from the housing cup 16. In particular, grip depressions 61 at the grip piece 60 can project past a bottom end of the housing cup 16. In the handling position, the grip piece 60 rests against the holder 52. In other words, a stop is established between the grip piece 60 and the holder 52 and limits the movability of these two components relative to each other.

Figure 4:
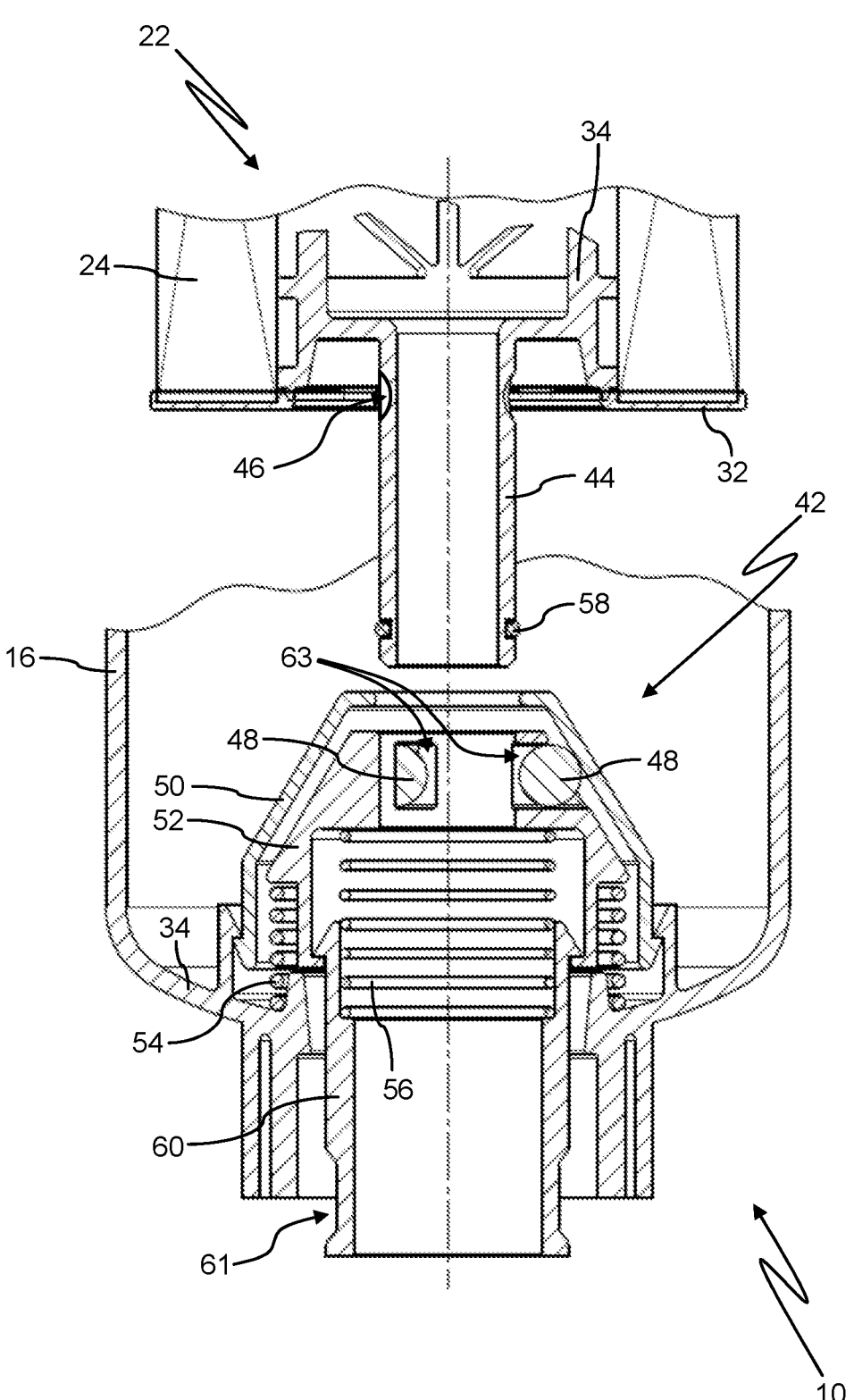
FIG. 4 shows the liquid filter of FIG. 2 in a release state with the filter element released from the lock device, in a schematic section view.

By pulling on the grip piece 60, the holder 52 can be moved into a release position illustrated in FIG. 4. By moving the holder 52 into the release position, the lock device 42 is transferred into a release state. Since the holder 52 is moved away from the receptacle 50, the lock means 48 can move radially outwardly in radial guide recesses 63 in the holder 52. Thus, the engagement of the lock means 48 in the lock groove 46 can be released. The extension part 44 can be pulled out of the lock device 42; thus, the filter element 22 can also be removed from the housing cup 16.

Upon insertion of a (new) filter element 22, the free end of the extension part 44 pushes the holder 52 via the lock means 48 against the action of the spring element 54 into the release position. In this context, the closure screw 40 can already be mounted again. When the filter element 22 is completely inserted, the lock means 48 move into the lock groove 46 due to the spring pretension. The filter element 22 is thus locked at the housing cup 16.

Figure 5:
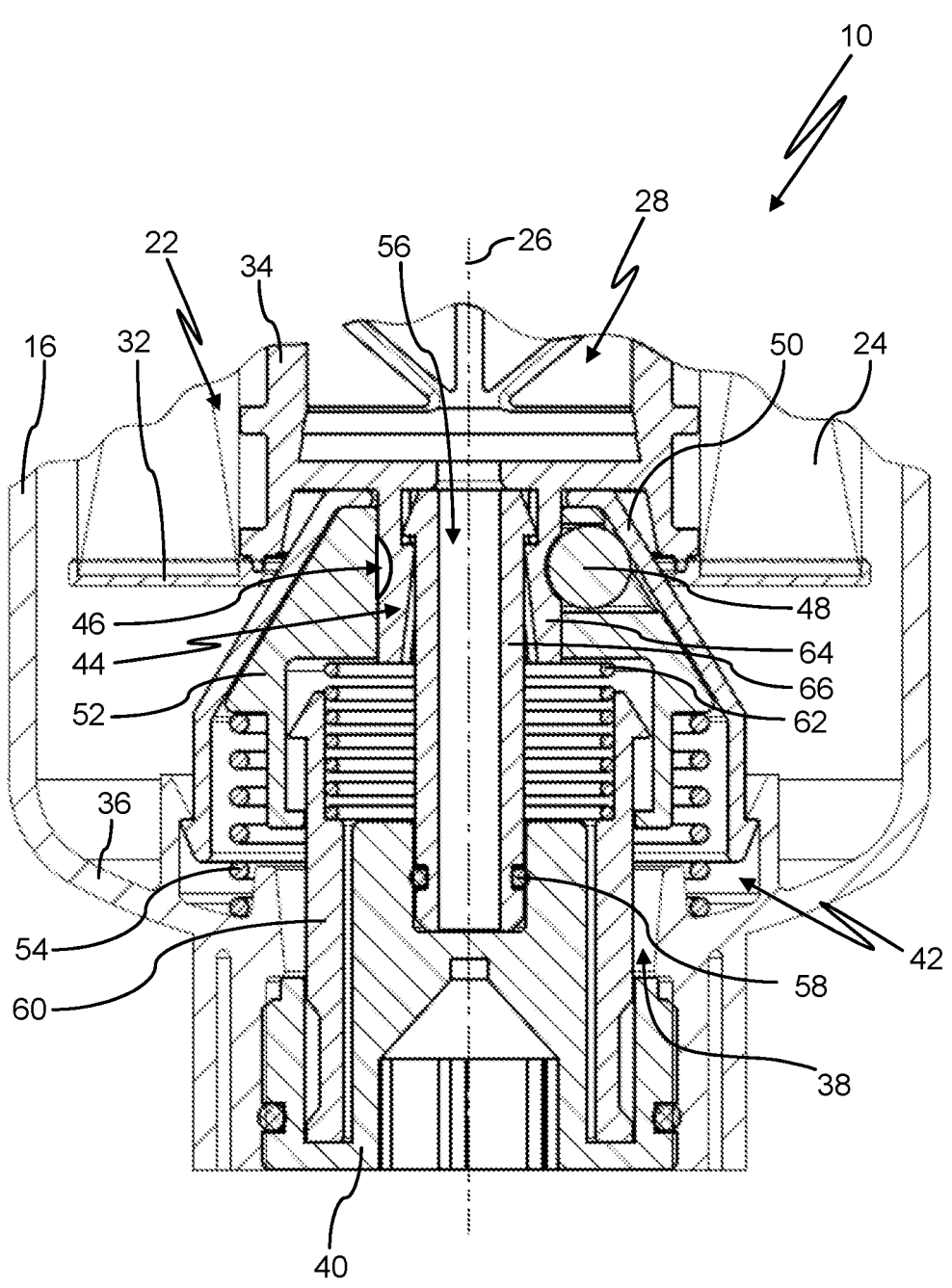
FIG. 5 shows a schematic enlarged illustration of a second embodiment of the liquid filter according to the invention in the region of the lock device in a locked state with screwed-in closure screw.

FIG. 5 shows a detail of a second embodiment of the liquid filter 10, which corresponds mostly to the first embodiment (compare FIGS. 2 through 4), in the region of the lock device 42. In particular, the lock device 42 of the housing cup 16 of the second embodiment illustrated in FIG. 5 corresponds in its functional construction to the lock device 42 of the first embodiment illustrated in FIGS. 2 through 4 and described above.

In the second embodiment illustrated in FIG. 5, the filter element 22 comprises a multi-part extension part 44. A nose 64 of the extension part 44 is rigidly connected to the filter medium 24. Here, the nose 64 is formed as one piece together with the support tube 34. The lock groove 46 is formed in the nose 64.

The extension part 44 comprises here furthermore a compensation element 66 which is guided movably in longitudinal direction at the nose 64 and is held at the nose 64. The longitudinal opening 56 extends through the nose 64 as well as through the compensation element 66.

In the mounted state, the closure screw 40 closes the drainage opening 38 as well as the longitudinal opening 56. For this purpose, the closure screw 40 engages the compensation element 66. Presently, the closure screw 40 is coupled by the seal element 58 to the compensation element 66 in that the seal element 58 is compressed between the closure screw 40 and the compensation element 66.

The movability of the compensation element 66 in relation to the nose 64 enables movements of the closure screw 40 in relation to the filter element 22 without this causing relative movements between the closure screw 40 and the extension part 44 at the seal element 58.

Figure 6:
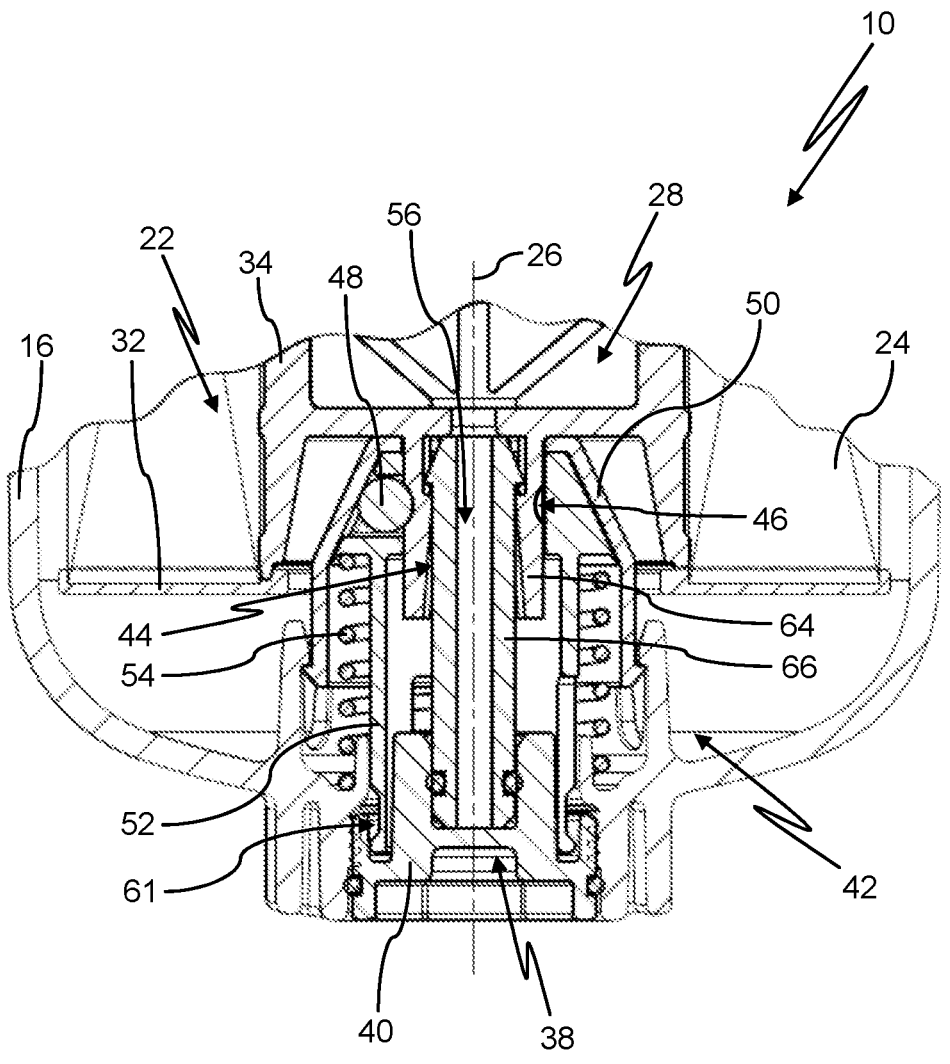
FIG. 6 shows a schematic enlarged illustration of a third embodiment of the liquid filter according to the invention in the region of the lock device in a locked state with screwed-in closure screw.

FIG. 6 shows a detail of a third embodiment of the liquid filter 10, which corresponds mostly to the second embodiment (compare FIG. 5), in the region of the lock device 42. In particular, the filter element 22 of the third embodiment illustrated in FIG. 6 corresponds in its functional configuration to the filter element 22 of the second embodiment illustrated in FIG. 5 and described above.

In the third embodiment illustrated in FIG. 6, there is no separate grip piece for the holder 52 provided. Here, grip depressions 61 are directly formed at the holder 52. After removal of the closure screw 40, the holder 52 remains initially in the illustrated locked position due to the pretension of the spring element 54. For moving the holder 52 into the release position, not illustrated in detail here, one must reach into the drainage opening 38.

In summarizing, the invention concerns a liquid filter in which a filter element can be locked at a housing cup. The filter element comprises an extension part with a lock groove. The lock groove can be formed as a rounded, in particular circular segment-shaped, depression at the extension part. At the housing cup, a lock device is provided. The extension part can be inserted into the lock device for locking. A lock means can be moved into the lock groove or can be disengaged from the lock groove. For this purpose, the lock means can be moved in particular in radial direction. The radial movability of the lock means can be established by a conical contact surface and an axially movable holder which entrains the lock means in axial direction but allows for radial movements of the lock means.

The invention claimed is:

1. A liquid filter comprising:
a filter housing comprising a housing cup having a drainage opening;
a filter element comprising a filter medium annularly surrounding a longitudinal axis of the filter element, wherein the filter element comprises an extension part provided with a circumferential lock groove, the extension part extending outward from the filter medium axially in relation to the longitudinal axis; and
a lock device comprising at least one lock means movable radially in relation to the longitudinal axis and arranged at the housing cup, wherein the at least one lock means engages the lock groove in a locked state of the lock device and is disengaged from the lock groove in a release state of the lock device,
wherein the filter housing further comprises a closure screw configured to close the drainage opening of the housing cup in a mounted state lre screw,
wherein the extension part of the filter element comprises a nose and a compensation element movable in relation to the nose, and
wherein the closure screw is coupled to the compensation element in the mounted state.

2. The liquid filter according to claim 1, wherein the lock groove comprises a rounded cross section.

3. The liquid filter according to claim 2, wherein the rounded cross section is circular segment-shaped.

4. The liquid filter according to claim 1, wherein the filter element further comprises a support tube and/or an end disk, and
wherein the extension part and the support tube and/or the end disk are formed together as one piece.

5. The liquid filter according to claim 1, wherein the at least one lock means is a ball.

6. The liquid filter according to claim 1, further comprising a holder movable between a locked position and a release position,
wherein the at least one lock means is guided in the holder.

7. The liquid filter according to claim 6, wherein the holder is pretensioned into the locked position.

8. The liquid filter according to claim 6, further comprising a receptacle,
wherein the holder is received in the receptacle.

9. The liquid filter according to claim 8, wherein the receptacle is locked at the housing cup.

10. The liquid filter according to claim 8, wherein the at least one lock means is supported at the receptacle in the locked state.

11. The liquid filter according to claim 6, wherein the lock device comprises a grip piece configured to move the holder, and wherein the grip piece is movable in relation to the holder.

12. The liquid filter according to claim 11, wherein the grip piece is pretensioned toward an outer side of the housing cup.

13. The liquid filter according to claim 11, wherein the lock device is arranged at the drainage opening of the housing cup.

14. The liquid filter according to claim 13, wherein the grip piece is supported at the closure screw when the closure screw closes the drainage opening in the mounted state.

15. The liquid filter according to claim 13, wherein the extension part comprises a continuous longitudinal opening, and
    wherein the closure screw closes the drainage opening of the housing cup and the continuous longitudinal opening in the mounted state.

16. A liquid filter comprising:
    a filter housing comprising a filter head and a housing cup;
    a filter element comprising a filter medium annularly surrounding a longitudinal axis of the filter element, wherein the filter element comprises an extension part provided with a lock groove;
    a lock device comprising at least one lock means movable radially in relation to the longitudinal axis and arranged at the housing cup, wherein the at least one lock means engages the lock groove in a locked state of the lock device and is disengaged from the lock groove in a release state of the lock device; and
    a holder movable between a locked position and a release position, the at least one lock means being guided in the holder,
    wherein the lock device comprises a grip piece configured to move the holder, and wherein the grip piece is movable in relation to the holder,
    wherein the housing cup comprises a drainage opening, and wherein the lock device is arranged at the drainage opening of the housing cup,
    wherein the filter housing further comprises a closure screw configured to close the drainage opening of the housing cup in a mounted state of the closure screw,
    wherein the extension part comprises a nose and a compensation element movable in relation to the nose, and wherein the closure screw is coupled to the compensation element in the mounted state.

17. The liquid filter according to claim 16, wherein the closure screw is coupled to the compensation element by a seal element.

18. A filter element for a liquid filter, the filter element comprising:
    a filter medium annularly surrounding a longitudinal axis of the filter element; and
    an extension part extending outward from the filter medium axially in relation to the longitudinal axis and provided with a circumferential lock groove, wherein the lock groove comprises a rounded cross section, and wherein the lock groove is configured to:
        be engaged by at least one lock device of a housing cup of a filter housing movable radially in relation to the longitudinal axis in a locked state of the at least one lock device; and
        be disengaged by the at least one lock device in a release state of the at least one lock device; and
    wherein the extension part comprises a nose and a compensation element movable in relation to the nose; and
    wherein a closure screw of the filter housing of the liquid filter is coupled to the compensation element in a mounted state of the closure screw.

19. The filter element according to claim 18, wherein the rounded cross section is circular segment-shaped.

20. The filter element according to claim 18, further comprising a support tube and/or an end disk,
    wherein the extension part and the support tube and/or the end disk are formed together as one piece with the extension part extending outward from the support tube and/or the end disk axially in relation to the longitudinal axis.

\* \* \* \* \*